United States Patent [19]

Dempsey et al.

[11] 4,018,032
[45] Apr. 19, 1977

[54] CONVEYOR MECHANISM

[75] Inventors: John E. Dempsey, Miamisburg; Russell F. Meinke, Germantown, both of Ohio

[73] Assignee: General Motors Corporation, Detroit, Mich.

[22] Filed: May 24, 1976

[21] Appl. No.: 689,584

[52] U.S. Cl. .................................. 53/247; 53/159; 53/248; 198/418; 198/472; 198/585; 214/17 CA; 53/59 R
[51] Int. Cl.² .......................................... B65B 5/10
[58] Field of Search ............ 53/247, 235, 159, 248, 53/59 R; 214/17 CA, 301; 198/571, 585, 418, 472

[56] References Cited

UNITED STATES PATENTS

| | | | |
|---|---|---|---|
| 3,010,562 | 11/1961 | Roehrbein et al. | 53/248 X |
| 3,147,846 | 9/1964 | Huntoon | 214/17 CA |
| 3,297,141 | 1/1967 | Janitsch et al. | 198/585 X |
| 3,578,146 | 5/1971 | Mehlschau | 214/17 CA X |
| 3,877,585 | 4/1975 | Burgess, Jr. | 214/17 CA |

*Primary Examiner*—Othell M. Simpson
*Assistant Examiner*—Horace M. Culver
*Attorney, Agent, or Firm*—Edward J. Biskup

[57] ABSTRACT

A conveyor mechanism having a conveying surface that is supported for movement along a rectilinear path and which is pivotable about a horizontal axis for positioning the conveying surface at various points in a container so as to facilitate filling thereof.

3 Claims, 4 Drawing Figures

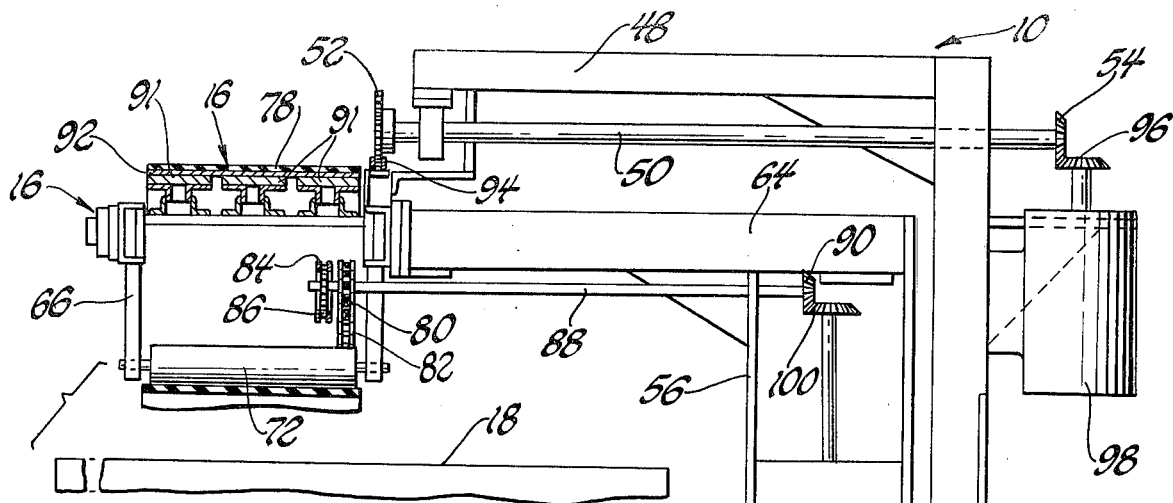
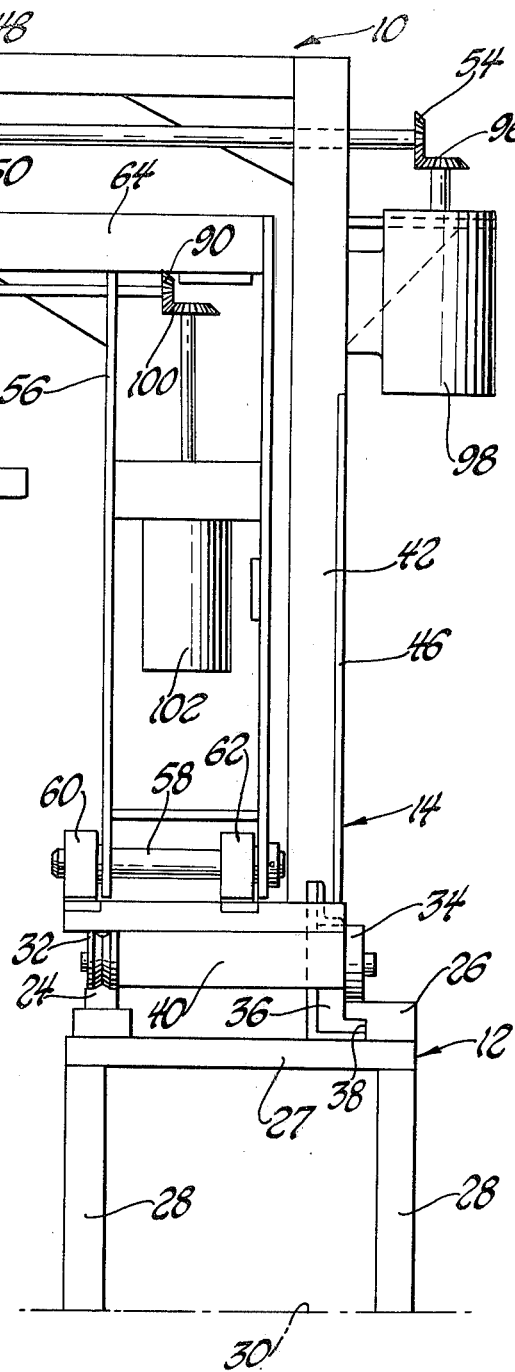
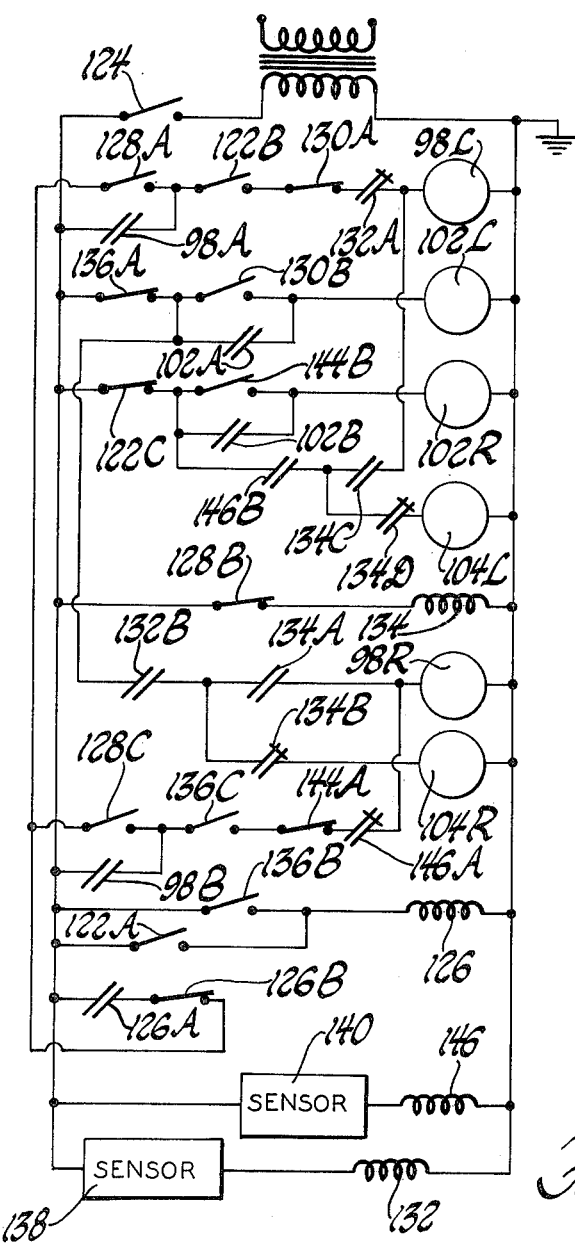
Fig. 2
Fig. 4

CONVEYOR MECHANISM

This invention concerns a conveyor mechanism that has a portion thereof that is movable towards the bottom of a container for depositing metal articles therein and is gradually raised and repositioned in a manner whereby the articles drop a minimum distance so as to prevent any damage to the articles while the container is being filled.

In the preferred form, the conveyor mechanism made according to the invention includes a stationary base which supports a movable carriage that has a roller frame provided with an endless conveyor belt for moving articles towards one end or the other thereof for loading the articles into one of a pair of containers. More specifically, the carriage supports a vertically oriented arm the upper end of which is secured to the roller frame midway between the ends thereof so that the arm and the roller frame form a generally T-shaped assembly. The lower end of the arm is mounted on the carriage which, in turn, is supported by the base for horizontal movement between a first position wherein the arm is located adjacent one of the containers and a second position wherein the arm is located adjacent the other of the containers. In addition, the lower end of the arm is pivotally connected to the carriage for movement about a transverse horizontal axis so as to permit one end of the roller frame to be moved downwardly about the horizontal axis to a point where a portion of the conveyor belt is positioned near the bottom of the container. Means are also provided for gradually raising the arm upwardly as the container is filled and for moving the carriage horizontally to facilitate the loading of the container after the arm is raised to the vertical position.

The objects of the present invention are to provide a new and improved article transporting device having an endless conveyor belt supported by a carriage for movement between two containers with the conveyor belt having the capability of having one end thereof alternately moved into each container for filling the latter; to provide a new and improved conveyor mechanism that deposits metal articles into a relatively deep container by initially having one end of a conveyor device located adjacent the bottom of the container and afterwards having the conveyor pivoted upwardly and moved horizontally as a unit as the container is being filled; to provide a new and improved conveyor mechanism that includes an endless conveyor for filling a container with metal articles without causing the latter to drop a distance which would cause damage thereto; and to provide a new and improved conveyor that has a curved conveying surface and that is supported for movement along a straight line path with capability of being pivoted about a transverse horizontal axis for positioning the conveyor at different points in a container so as to facilitate filling thereof.

Other objects and advantages of the present invention will be apparent from the following detailed description when taken with the drawings in which:

FIG. 2 is an enlarged view of the conveyor mechanism taken on lines 2—2 of FIG. 1;

FIG. 4 is a schematic diagram of the electric circuit for controlling operation of the motors associated with the conveyor mechanism of FIGS. 1–3.

Figure 1:
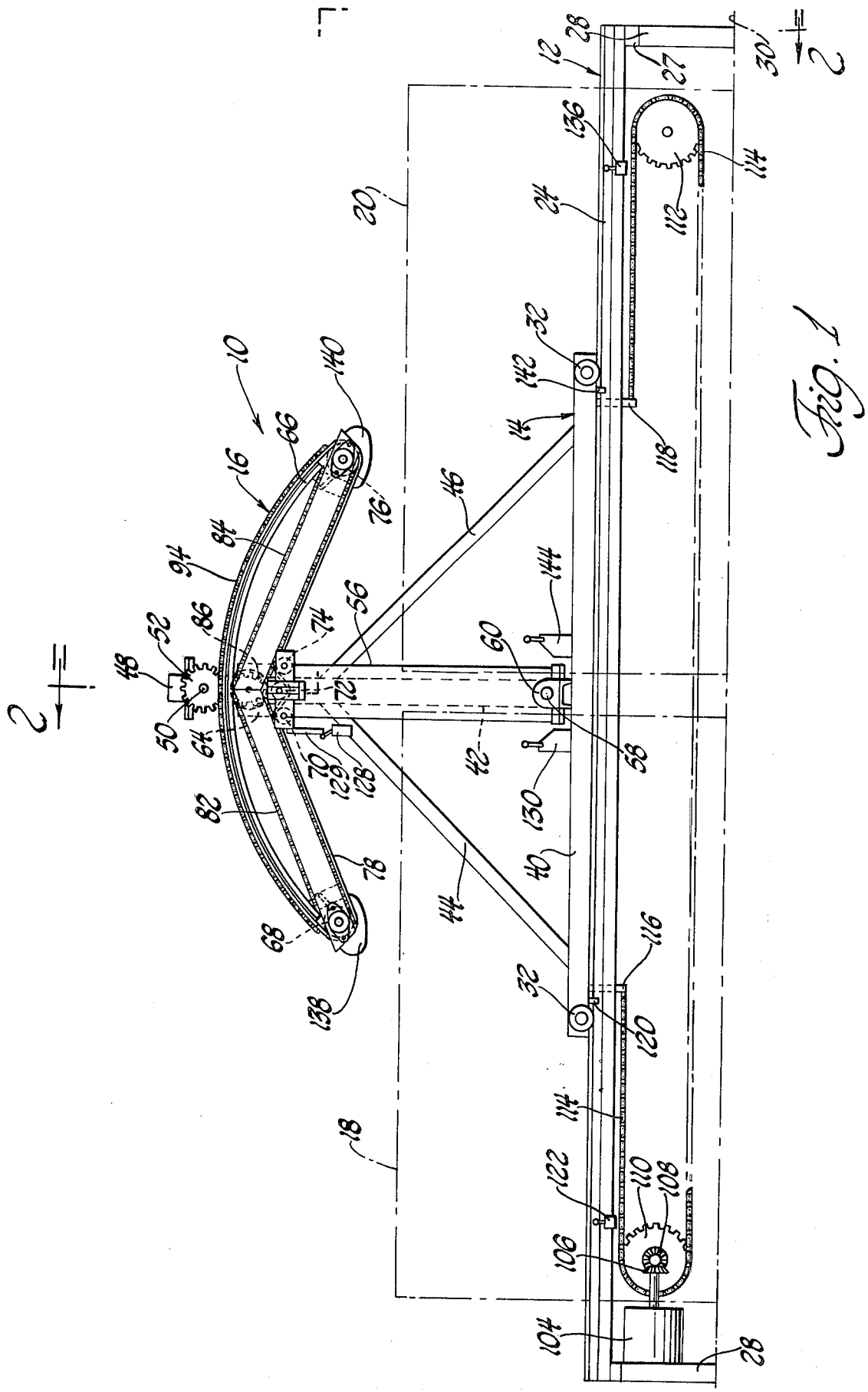
FIG. 1 is an elevation view showing a conveyor mechanism made according to the invention.

Referring to the drawings and more particularly FIGS. 1 and 2 thereof, the conveyor mechanism 10 made according to the invention is shown as basically comprising a base 12, a carriage 14, and a conveyor assembly 16. A pair of identical rectangular containers 18 and 20 made of a metallic material are shown in phantom lines as being positioned adjacent to the conveyor mechanism 10 and serve to receive metal articles which are deposited into the containers by the conveyor mechanism 10 in a manner which will be explained hereinafter.

The base 12 includes a pair of elongated parallel rail members 24 and 26 secured to the top portion of a rectangular frame 27 having an upright leg 28 at each corner that rest on a floor 30. The carriage 14 is adapted to move horizontally between the full line position and the phantom line position shown in FIG. 3 along the rails 24 and 26 and, in this connection, it will be noted that the carriage 14 is provided with a pair of rollers 32 and 34 at each end thereof. The roller 32 is v-grooved at the periphery thereof and mates with a complementary "V" surface on the associated rail member 24 while the other roller 34 has a generally flat peripheral face for moving along the associated flat rail member 26. An inverted J-shaped block member 36 is provided adjacent each end of the carriage 14 and cooperates with a longitudinally extending groove 38 formed in the rail member 26 the full length thereof for preventing the carriage 14 from tipping relative to the base 12 because of the overhang of the conveyor assembly 16 as seen in FIG. 2.

The carriage 14 includes a rectangular frame 40 which is supported by the rollers 32 and 34 at each end thereof. The frame 40 rigidly supports a vertically oriented structural member 42 that is held in an upright position by brace members 44 and 46. The upper end of the member 42 is formed with a laterally extending horizontal bar 48 the outer end of which supports one end of a rotatable shaft 50 having a gear 52 fixed thereto. The other end of the shaft 50 extends through the member 42 and rigidly supports a bevel gear 54.

The conveyor assembly 16 is generally T-shaped and includes an upright arm 56 the lower end of which is connected to a transverse shaft 58 supported by a pair of spaced bearing assemblies 60 and 62 supported by the frame 40. The upper end of the arm 56 has a laterally extending horizontal member 64 the outer end of which rigidly supports a conveyor device 66. The conveyor device consists of a roller frame which supports a plurality of rollers 68, 70, 72, 74, and 76 about which an endless rubber belt 78 is adapted to be driven. The end rollers 68 and 76 serve to drive the belt 78 and, in turn, are driven through a chain and sprocket arrangement. Thus, the roller 68 is connected with a sprocket wheel 80 driven by a chain 82. Similarly the other end roller 76 is driven by a chain 84 which, in turn, is connected to a sprocket wheel 86. Both sprocket wheels 80 and 86 are fixed with one end of a common shaft 88 the other end of which is rotatably supported by the arm 56 and includes a bevel gear 90. It will be noted that the upper surface of the roller frame of the conveyor device 66 serves to support a plurality of magnets 91 each of which extends the longitudinal length of the roller frame and which, as seen in FIG. 2, are located beneath an arcuately shaped sheet metal cover 92 over which the upper portion of the belt 78 travels. The rearward portion of the roller frame at the upper end thereof has a chain 94 secured along its entire length to the housing. This chain 94 meshes with gear 52 connected to the shaft 50. The shaft 50 is driven through the bevel gear 54 by a bevel gear 96 secured to the output shaft of a reversible electric motor 98 mounted to the member 42. Thus, when the motor 98 is energized, the conveyor device 66 is arced or pivoted together with the arm 56 about the horizontal center axis of the shaft 58. The pivotal movement will be in one direction or the other as seen in FIG. 3 depending upon the direction of rotation of the motor 98.

It will also be noted that the bevel gear 90 on shaft 88 meshes with a bevel gear 100 secured to the output shaft of a reversible electric motor 102 carried by the arm 56. Thus, depending on the direction of rotation of the output shaft of the motor 102, the belt 78 is driven through the sprocket wheels 80 and 86 in a clockwise or counterclockwise direction as viewed in FIG. 1.

Figure 3:
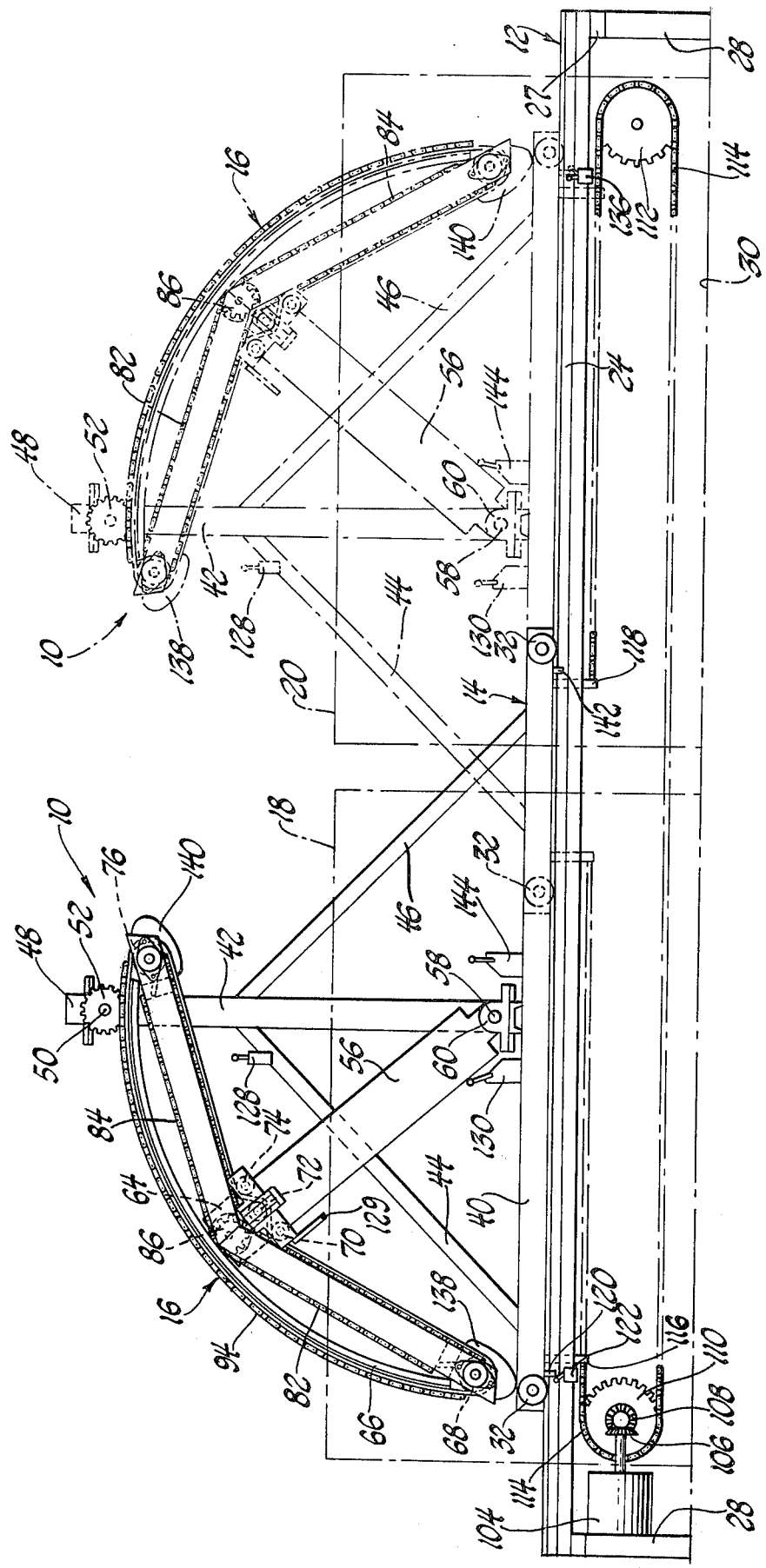
FIG. 3 is a view similar to FIG. 1 but shows the conveyor device incorporated with the conveyor mechanism located in two positions for filling the associated containers.

The carriage 14 is movable between the full line position and phantom line position shown in FIG. 3 by a drive arrangement that includes a reversible electric motor 104. The motor 104 is supported by the base 12 and has its output shaft provided with a bevel gear 106 which meshes with a similar bevel gear 108 rigid with a sprocket wheel 110 rotatably supported by the base 12 adjacent one end thereof. A similar sprocket wheel 112 is located adjacent the other end of the base 12 and a chain 114 is entrained about the sprocket wheels 108 and 110 with one end of the chain fixed to the carriage through a depending lug 116 while the other end of the chain is fixed with the other end of the carriage through a lug 118. Thus, depending upon the direction of rotation of the motor 104, the carriage 14 can be moved to one of the aforementioned positions shown in FIG. 3 from the central position shown in FIG. 1.

The conveying mechanism described above operates as follows:

It will be first assumed that the two containers 18 and 20 are located in the positions shown in FIGS. 1 or 3 and are empty. Also, although not shown, a suitable hopper is provided above the conveying device 66 with the unloading end of the hopper being connected to the bar 48 adjacent the gear 52 and being adapted to move horizontally with the carriage 14 and deposit metal articles such as discs onto the upper surface of the conveying belt 78.

The motor 104 will initially be energized to cause the carriage 14 to move to the left as seen in FIG. 1 until a projection 120 secured to the underside of the carriage 14 engages a limit switch 122 carried by the base 12. At this time and with reference to the control circuit shown in FIG. 4, the carriage 14 will stop and the on-off switch 124 will be closed causing energization of relay coil 126 through the N.O. contacts 122A of the limit switch 122. The relay coil 126 closes normally open contacts 126A and a short time delay thereafter opens normally closed contacts 126B. While the relay contacts 126A and 126B are closed, the arc right winding 98L of motor 98 is energized through a mid-position normally open contacts 128A of limit switch 128, normally open contacts 122B of limit switch 122, normally closed contacts 130A of limit switch 130, and normally closed relay contacts 132A. When the motor winding 98L is energized, normally open contacts 98A are closed to maintain the motor winding 98L energized as the gear 52 drives the conveyor device 66 in a counterclockwise direction to the full line position of FIG. 3. Simultaneously, the contacts 128A are opened and contacts 128B are closed as the arm 56 and the projection 129 moves from the mid-position of FIG. 1. The closing of contacts 128B causes energization of relay coil 134, and when the arm 56 is fully arced to the left as seen in FIG. 3, the arm 56 contacts the limit switch 130 and the normally closed contacts 130A are opened to deenergize the motor winding 98L. At this point, the winding 102L of motor 102 is energized to drive the sprocket wheels 80 and 86 in a counterclockwise direction as seen in FIG. 1. The winding 102L is energized through normally closed contacts 136A of limit switch 136 and normally open contacts 130B of limit switch 130 that has been tripped by the arm 56. Normally open contacts 102A are then energized by the motor winding 102L to maintain the conveyor belt operating when the normally open contacts 130B are open when the arm 56 is arced away from the full left position of FIG. 3.

Thus, when the conveyor device 66 reaches the position of FIG. 3, the arm 56 engages the limit switch 130 which, as explained, causes energization of the motor 102 which, in turn, drives the sprocket wheels 80 and 86 and accordingly the belt 78 in a counterclockwise direction about the supporting rollers 68, 70, 72, 74 and 76. The metal articles are deposited onto the upper surface of the conveyor device 66 adjacent the gear 52 and, inasmuch as they are held to the belt 78 by the magnets 91 incorporated with the roller frame, the articles move downwardly into the container 18 until they reach the lower end of the conveyor where a sensor device 138 causes the articles to be stripped from the belt 78 and dropped into the container. One sensor device used with a conveyor mechanism made according to this invention was identified as Cat. No. STO-8001 "Tuchswitch" made by RB Dension Co. It will be noted that a similar sensor device 140 is located at the other end of the conveyor device 66.

The articles continue to be deposited into the container 18 with the conveyor device 66 located in the position of FIG. 3 until the articles are piled to a height where physical contact with the sensor device 138 is maintained so that an electric circuit is established with the grounded metal container 18. As a result, relay coil 132 is energized to close normally open contacts 132B so that the arc right winding 98R of motor 98 is energized through the normally closed contacts 136A, normally open contacts 132B and 134A which was closed when relay coil 134 was energized as the arm 56 was moved counterclockwise from its vertical or mid-position. With the winding 98R of the motor 98 energized, the arm 56 and accordingly the conveyor device 66 is rotated in a clockwise direction until no further electrical contact is made by the sensor device 138 with the articles located within the container 18 so as to deenergize relay coil 132 and deenergize the motor winding 98R. The conveyor belt 78 continues to deposit the articles into the container 18 and as the latter fills and the sensor again energizes relay coil 132, the arm 56 will continue to move in a clockwise direction until it reaches the upright mid-position of FIG. 1. At this point, the projection 129 again contacts the limit switch 128 so that normally closed contacts 128B are opened to deenergize relay coil 134 which causes contacts 134A to open and the normally closed contacts 134B to close. Thereafter, when the articles cause the sensor device 138 to energize relay coil 132, the travel right winding 104R of motor 104 is energized through the normally closed contacts 136A, 134B, and N.O. 132B to move the carriage 14 towards the right. The carriage 14 is moved to the right periodically in this manner while the conveyor device 66 continues to deposit articles into the container 18. Thus, when the articles reach a height where they again cause the sensor device 138 to energize relay coil 132, the motor winding 104R is energized causing the carriage 14 to move towards the right so as to continue filling the container 18.

Movement of the carriage 14 in a rightward direction as well as the filling of container 18 continues until the projection 142 on the carriage 14 engages the limit switch 136 located adjacent the sprocket wheel 112. At this point the hopper discontinues supplying articles to the conveyor device 66 and the normally closed contacts 136A are opened. At the same time, the normally open contacts 136B are closed to again energize relay coil 126 which was deenergized when the contacts 122A of limit switch 122 were opened when the carriage 14 was moved from the left position. The contacts 126A and 126B energize the arc right winding 98R of motor 98 through normally open contacts 128C of limit switch 128 that is closed when the arm 56 is in the mid-position, normally open contacts 136C of limit switch 136 that is closed by the projection 142, and normally closed contact 144A of arc-right limit switch 144 and normally closed contacts 146A. Energization of the motor winding 98R causes closing of normally open contact 98B to maintain the winding 98R energized after the normally open contacts 128C open as the arm 56 is rotated clockwise. As the arm 56 moves clockwise from the mid-position, contacts 128B of limit switch 128 closes to energize the relay coil 134. When the arm 56 is fully arced to the phantom line position of FIG. 3, the arm 56 trips limit switch 144 so that normally closed contacts 144A open to deenergize the motor winding 98R. The direction of movement of conveyor belt 78 is then reversed by the energization of winding 102R so that the articles will now be deposited into the empty container 20. The motor winding 102R of motor 102 is energized through the normally closed contacts 122C of limit switch 122 and the normally open contacts 144B of limit switch 144 which is now closed by the arm 56. The motor winding 102R closes normally open contacts 102B to maintain the conveyor belt 78 running after the normally open contacts 144B open as the arm 56 is arced to the left or counterclockwise as viewed in FIG. 3.

From the above it should be apparent that when the motor winding 98R is energized, the arm 56 pivots in a clockwise direction to the position shown in FIG. 3 until it contacts the limit switch 144. Also, the conveyor belt drive motor 102 is energized so that the belt 78 is driven about the rollers in a clockwise direction causing the articles now deposited on the belt to move into the lower portion of the container 20. The articles continue to move into the container 20 and when they reach a height where they cause the right sensor device 140 to be grounded through the articles and the container, the relay coil 146 is energized to close normally open contacts 146B, so as to energize the arc left winding 98L of motor 98 through the normally closed contacts 122C of limit switch 122, normally open contacts 146B and the normally open contacts 134C. The motor 98 is energized causing the arm 56 to be raised gradually as the container 20 is filled as before until the arm 56 reaches the upright mid-position at which time the projection 129 trips limit switch 128 so that the contacts 128B are opened to deenergize relay 134 to open normally open contacts 134C and close the normally closed contacts 134D. Thereafter, when the articles contact the right sensor device 140 and establish the electric circuit through the metal container 20 to energize the relay coil 146, the travel left winding 104L of motor 104 is energized through contacts 122C, 146B and 134D to move the carriage 14 to the left until the carriage returns to the full left position to then repeat the cycle and start depositing the articles into an empty container located in the same position as the container 18.

From the above description, it should be apparent that the conveyor mechanism 10 causes the conveyor device 66 to be moved by the carriage 14 automatically for depositing metal articles into the containers 18 and 20, as the containers are filled, they are replaced with empty containers so that loading can continue without interruption. Also, by permitting the conveyor device 66 to pivot into the container, the distance between the dispensing end of the belt 78 and the landing point for the articles is minimized so as to substantially eliminate the possibility of damage to the articles as they move into the container.

Various changes and modifications can be made in this construction without departing from the spirit of the invention. Such changes and modifications are contemplated by the inventors and they do not wish to be limited except by the scope of the appended claims.

We claim:

1. A conveyor mechanism supported by a base for alternately depositing articles into a pair of spaced containers each of which has a bottom floor, said conveyor mechanism including an elongated frame, a plurality of rollers on said frame supporting an endless belt for moving said articles towards one end or the other end of said frame, an arm having its upper end secured to said frame, a carriage supporting the lower end of said arm, said carriage being supported by said base for horizontal movement between a first position wherein said arm is located adjacent one of said containers and a second position wherein said arm is located adjacent the other of said containers, the lower end of said arm being pivotally connected to said carriage about a horizontal axis for permitting one end of said frame to be moved downwardly about said horizontal axis to a point near the bottom floor in the adjacent container and gradually raised upwardly as the adjacent container is filled when the carriage is located in said first position and in said second position.

2. A conveyor mechanism supported by a base for alternately depositing metal articles into a pair of spaced containers each of which has a bottom floor, said conveyor mechanism including an elongated frame having a curved upper surface, a plurality of rollers on said frame supporting an endless belt for moving said articles towards one end or the other end of said frame, an arm having its upper end secured to said frame between the ends thereof, a carriage supporting the lower end of said arm, said carriage being supported by said base for horizontal movement between a first position wherein said arm is located adjacent one of said containers and a second position wherein said arm is located adjacent the other of said containers, the lower end of said arm being pivotally connected to said carriage about a horizontal axis for permitting one end of said frame to be moved downwardly about said horizontal axis to a point near the bottom floor in the adjacent container and gradually raised upwardly as the adjacent container is filled when the carriage is located in said first position and in said second position.

3. A conveyor mechanism supported by a base for alternately depositing metal articles into a pair of spaced containers each of which has a bottom floor, said conveyor mechanism including an elongated frame having a curved upper surface, a plurality of rollers on said frame suporting an endless belt for moving said articles towards one end or the other end of said frame, magnetic means on said frame for holding said articles on said belt as they move to one end or the other end of said frame, a generally vertically oriented arm having its upper end secured to said frame, a carriage supporting the lower end of said arm, said carriage being supported by said base for horizontal movement between a first position wherein said arm is located adjacent one of said containers and a second position wherein said arm is located adjacent the other of said containers, the lower end of said arm being pivotally connected to said carriage about a horizontal axis, and drive means including a control system causing one end of said frame to be moved downwardly about said horizontal axis to a point near the bottom floor in the adjacent container and gradually raised upwardly as the adjacent container is filled until the arm assumes an upright position after which the carriage is moved horizontally for completing the filling of the container.

* * * * *